I. HECHENBLEIKNER AND T. C. OLIVER.
METHOD OF TREATING SLUDGE ACIDS.
APPLICATION FILED JAN. 7, 1922.
1,429,140.
Patented Sept. 12, 1922.
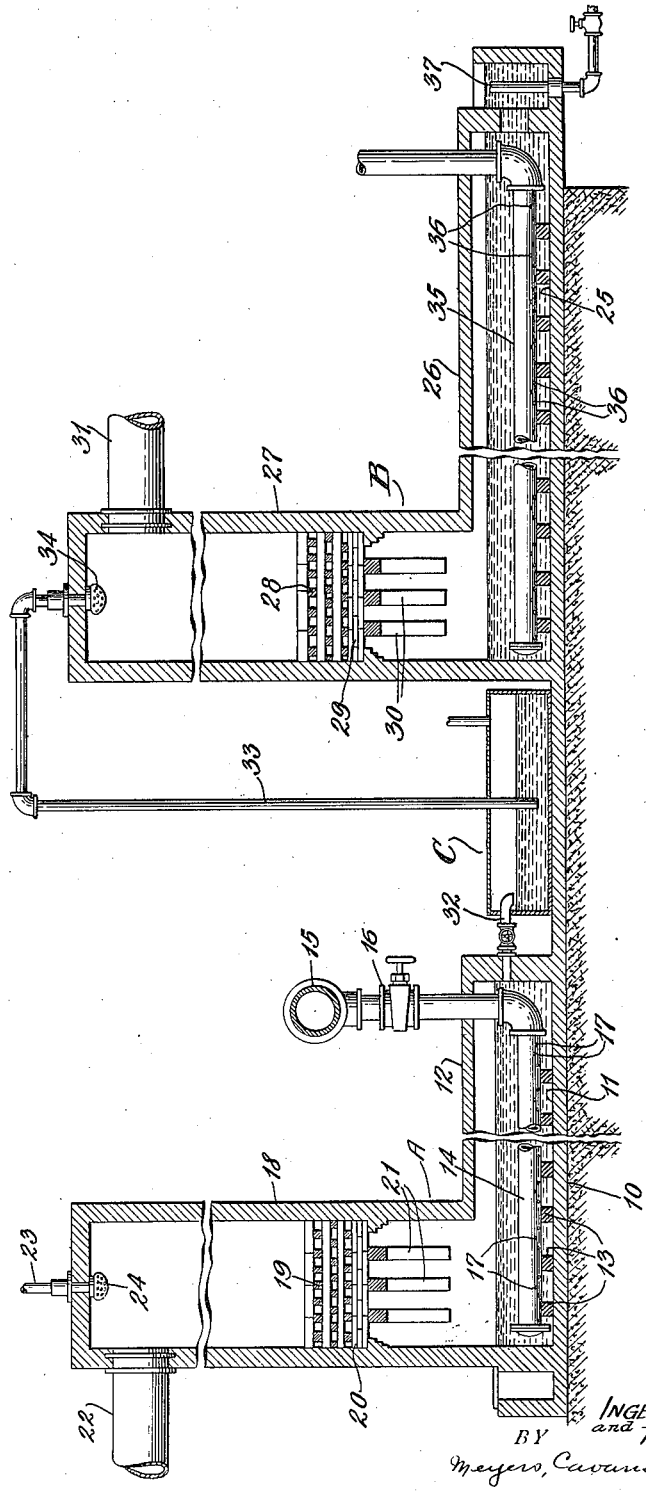
INVENTORS
INGENUIN HECHENBLEIKNER
and THOMAS C. OLIVER
BY
Meyers, Cavanagh & Whitehead,
ATTORNEYS Patented Sept. 12, 1922.

1,429,140

UNITED STATES PATENT OFFICE.

INGENUIN HECHENBLEIKNER AND THOMAS C. OLIVER, OF CHARLOTTE, NORTH CAROLINA, ASSIGNORS TO CHEMICAL CONSTRUCTION COMPANY, OF NEW YORK, N. Y., A CORPORATION OF NORTH CAROLINA.

METHOD OF TREATING SLUDGE ACIDS.

Application filed January 7, 1922. Serial No. 527,532.

*To all whom it may concern:*

Be it known that we, INGENUIN HECHENBLEIKNER and THOMAS C. OLIVER, citizens of the United States, and both residents of Charlotte, in the county of Mecklenburg and State of North Carolina, have invented certain new and useful Improvements in Methods of Treating Sludge Acids, of which the following is a specification.

This invention relates to a method of treating sludge acids or separated sludge acids obtained in the refining of mineral oils and relates more particularly to the concentrating and purifying of the sludge acids which are carried on in two stages; and has special reference to the treatment of the sludge acid in the first concentrating stage.

In the carrying out of our process for concentrating and purifying sludge acids we preferably subdivide the heating of the sludge acids in two stages, the acid being concentrated in the first stage up to an intermediate point and after considerable of the impurities are removed from the acid by treatment in this stage, the partially concentrated and purified acid is heated again in a second stage to effect complete concentration and purification. In our copending application Serial No. 477,936, filed June 16, 1921, we disclose such a two-stage process, and in the said application we disclose the carrying on of the process by treating the acid in the first stage while preferably keeping the same below a concentration at which coking, charring or foaming of the hydrocarbons in the acid takes place, the acid being treated in the second stage for completion of the concentration and purification of the same. In this two-stage process the treatment in the first stage is carried on by bubbling hot air or hot gases through a bath to effect concentration and purifcation of the acid, a weak feed acid being introduced in this bath and being run counter-current to the spent gases exiting from the bath, the weak feed acid being run through a tower with the acid preheated by the current of spent gases moving upwardly through the tower. Our present invention relates to the treatment of sludge acids in such two stages, and more particularly to improvements in the method of treating sludge acid in the first operating stage; and has special reference to steps of controlling the preheating in the tower to effect certain desirable results.

In the treatment of sludge acids to concentrate the same to intermediate strengths at the first stage of treatment, we have found that when a bath of sludge acid is heated as by the bubbling of hot gases therethrough to effect concentration, that at some temperature foaming of the bath takes place. This foaming takes place at relatively low concentrations or strengths of the acid and may be so voluminous as to render the concentration very difficult, if not impossible. We have further found that the preheating in the tower may be controlled in such a manner as to prevent foaming at low concentrations of the acid in the bath; and our present invention has special reference to a method of treating the sludge acids wherein the preheating in the tower is controlled to attain this end.

As a result of extended experimentation on the preheating of the weak feed acid in the tower, it has been further found that if the preheating is carried on above a certain temperature range, that a deposition of impurities takes place in the tower with the result that the tower becomes clogged or plugged up, requiring a frequent shutting down of the apparatus and a cleaning of the tower. We have found that the preheating in the tower may be further controlled to the end of preventing the deposition of impurities therein, thus eliminating the plugging up of the tower and the disadvantages incident thereto, and our present invention further relates to the method of controlling or regulating the preheating effect of the tower to minimize or completely prevent deposition of these impurities.

The figure is a cross-sectional view of the apparatus we prefer to use in the carrying out of our method.

In the practice of our method, hot gases are bubbled through a bath of the acid and the spent gases liberated from the bath move through a tower packed with checker-work or the like, through which tower the weak acid is run countercurrent to the spent gases, the spent gases effecting a preheating of the acid. This preheating has usually been carried on indiscriminately in prior processes merely to obtain a fuel economy and the preheating has been carried on to a degree insufficient to effect the prevention of foaming at low concentrations or strengths. In our invention the preheating is carried on sufficiently to change the foaming point from a low concentration to a high concentration. In the preheating we have found that if it is carried on sufficiently, considerable of the volatile hydrocarbons and $SO_2$ gas either in the shape of $SO_2$ entrained by the acid or in the shape of sulphurous acid, is driven off in the tower. The volatile hydrocarbons and the $SO_2$ are easily volatilized at comparatively low temperatures and we have found that if these are not removed before entering the concentrating bath, excessive foaming results at such strengths of the acid in the bath as to render concentration extremely difficult or almost impossible. Therefore, in the practice of our method, we extend the preheating of the incoming weak acid to such an extent as to drive out sufficient of the volatile hydrocarbons and the $SO_2$ to change the foaming point from low to high concentration.

As hereinbefore referred to, if the preheating effect in the tower is made too strong, a deposition of impurities takes place. In experimenting on this deposition factor we have discovered that if the preheating is carried on much or greatly above the boiling point of the weak feed acid the impurities therein such as the carbon and the sulphates will be deposited, with concentration of the acid taking place in the tower. The deposition is in the form of carbon and sulphates and this deposition of impurities causes the plugging up referred to. In the practice of our method, therefore, although the preheating is extended to drive off the volatile impurities, such preheating is kept below a predetermined point to prevent concentration in the tower and therefore to eliminate the factor of deposition of impurities. The temperature in the tower, therefore, should be regulated above a predetermined minimum so as to volatilize the higher hydrocarbons and sulphur dioxide and should be regulated below a predetermined maximum in order to prevent the deposition of carbon and sulphates in the tower, which causes the plugging up of the same.

To effect the desired results our method consists, generally speaking, in effecting the desired preheating in the tower by control of the gases flowing therein so that the heat exchange in the tower takes place between the temperature of the bath and the boiling point of the incoming weak acid. As specific examples we may cite the following:

Example 1: Assuming it is desired to produce in the bath a concentration of $52\frac{1}{2}$ degrees Baumé, and assuming further that the week feed acid is about 32 degrees Baumé, the following conditions control.

$52\frac{1}{2}$ degrees Baumé, boiling point 320° F.
Temperature of the bath, 245° F.
32 degrees Baumé, boiling point 265° F.

Under these conditions, in order the preheat the acid sufficiently in the tower, a tower of about 30 ft. height is used and the gases exiting from the bath are so controlled as to have a temperature of about 300 degrees F., with the gases exiting from the tower at about 160 to 170 degrees F. Generically speaking, the gases moving through the towers should be below the boiling point of the incoming weak feed acid and thus below 265 degrees, the temperature of the gases being, however, above about 245 degrees, which is the temperature of the bath, in order to obtain a heat exchange in the bath. However, it has been found that the temperature of the gases exiting from the bath may be somewhat above the concentration point of the incoming weak feed acid, and a moderate excess of temperature here can be permitted for the reason that these warm gases leave the acid bath partially saturated with moisture and there is little tendency for these gases to rob the downcoming weak acid of its excess water contents thereby concentrating the same and depositing carbon and sulphates, until the temperature of the downcoming weak acid is raised to its actual boiling point and then supplied with enough additional heat in order to overcome the latent heat of evaporation. Our warm escaping gases do not have enough excess temperature to perform this function. Furthermore, a moderate excess temperature is permissible at the commencing of the heat exchange, as the exchange of heat is extremely slow when the two baths approach an equal temperature. Therefore, in this instance the gases should leave the bath at a temperature above 245° F., otherwise there is no heat exchange in the bath and at a temperature at or below 300 degrees F. the mean temperature in the tower to be such that the heat exchange will not concentrate the acid in the tower and effect deposition of impurities. When the process is carried on in this manner it is found that instead of the bath foaming at a low concentration such as, for example, at 47 degrees Baumé, the foaming point will not be reached until about 55 or 57 degrees Baumé, thus eliminating foaming problems at the low stage treatment.

Example 2: Taking another example and assuming that it is desired to concentrate in the low stage in the bath to 47 degrees Baumé, with the weak feed still at 32, the following conditions control:

47 degrees Baumé, boiling point 285° F.
Temperature of bath, 230° F.
32 degrees Baumé, boiling point 265° F.

With these conditions the gases exiting from the bath should be controlled as to have a temperature of 285 degrees F. when entering the tower and at about 160 degrees F. when leaving the tower. With this temperature (285° F.) exchange of heat in the tower takes place below the concentration point 265° F. of the weak feed acid and above the temperature of the acid in the bath.

Example 3: Assuming it is desired to concentrate in the bath to 57 degrees Baumé, the following conditions control:

57 degrees Baumé, boiling point 360° F.
Temperature of the bath, 270 degrees F.
32 degrees Baumé, boiling point 265° F.

With this state of affairs the temperature of the exiting gases in the bath should be about 325 degrees F., with the gases exiting from the tower at about 170 degrees. With these temperatures it has been found that the heat exchange in the bath is sufficient to eliminate the low concentration foaming point and to prevent concentration in the tower and resulting deposition of impurities.

In the above examples the weak feed acid has been assumed about 32 degrees Baumé. This relates to the acids obtained with use with the Eastern type of oils, which are of the less asphaltic base oils and may even include such oils as Mexican oil. With the Western type of oils such as California oil, the weak feed acid may range from 48 to 52 degrees Baumé more or less. With about 50 degrees Baumé of the incoming weak feed acid, the boiling point of such acid being about 295 degrees, it will be seen that the temperature of the gases may still be controlled if, for example, 57 degrees Baumé is desired to be obtained in the bath so as to obtain an elimination of low concentration foaming and an elimination of deposition of impurities, the gases being made to exit at about 325 or 335 degrees F.

In the carrying out of our process, to control the temperature of the exit bath gases, we have found that the desired ends may be obtained in any of a variety of ways and the following are a few of the more practical methods of controlling these temperatures.

1. The temperature of the incoming hot gases may be varied.

2. The elevation of the pipes submerged in the bath may be varied to control the depth of submergence, which, in turn, controls the temperature of the gases escaping from the bath. This may efficaciously be done by varying the level of the acid in the bath.

3. The volatilizing of the contaminations desired to be removed may also be obtained by varying the height of the tower and the closeness of the packing contained therein, both or either effecting a greater heat exchange if increased and therefore yielding a greater volatilization effect with equal temperatures of the gases or permitting an equal volatilization effect with a lower temperature of the gases.

Our invention comprehends the controlling of the temperature within the desired range in any or all of these manners.

Referring now more in detail to the drawings, we provide two concentrating chambers A and B respectively, the concentrating chamber A being intended for heating and concentrating the weak sludge acid up to an intermediate strength such as for example 57 degrees Baumé, or other intermediate strengths as for example cited above, the heating and concentrating chamber B being intended for effecting further concentration of the acid above the said intermediate strength. The chambers are substantially similar in structure, both being supported by a suitable foundation which may for example be a cement foundation 10, the chamber A, preferably in the form of an elongated trough-like flue which is preferably about 25 ft. in length, having a bottom 11 constructed of suitable acid-resisting brick, the trough section being provided with an arched roof 12 also preferably constructed of an acid-resisting brick. Supported longitudinally on the bottom of the trough, as by means of blocks 13 also preferably made of acid-resisting material, are one or more pipe sections 14, one being shown in the drawings, the pipe section 14 being also made of a suitable acid-resisting material and adapted for conducting heated air or gases from a suitable source, such as a furnace, not shown, the pipe section 14 being connected to a main conduit 15 which is in turn connected to the furnace, a valve 16 being interposed in the line of connection between the conduit 15 and the pipe 14 for controlling the flow of the heated gases into the pipe section 14. The conducting pipe 14 is provided with a plurality of perforations 17 spaced along the pipe, the perforations functioning as ports for admitting the heated air or gases into the concentrating chamber. Communicating with the trough-like heating or concentrating chamber is a tower 18 which may be about 30 ft. in height and constructed of suitable acid-resisting brick, this tower being intended for preheating purposes, the preheating being so controlled as to primarily drive off the more volatile hydrocarbons and the $SO_2$ entrained in the sludge acid, this to the end of advancing the foaming point of the sludge acid as heretofore pointed out. The tower 18 is preferably provided with a brick checker-work 19 supported by bridge 20 formed of parallel rows of bricks, the bridge being in turn supported by a series of spaced arches 21. The checker-work bricks 19 may be spaced for example from 5 to 8 inches from center to center, the spacing of the brick with the size of the tower being factors in determining the heat exchange in the tower and the effective preheating of the weak feed acid as has been pointed out above.

Communciating with the tower 18 at a region near the roof thereof is an outlet pipe section 22, the said pipe section functioning as an outlet flue for the spent gases and steam issuing from the chamber A. The heating and concentrating chamber A is intended for the reception of a body of weak separated sludge acid, the said acid being preferably introduced into the said chamber by way of the tower 18 and by means of an inlet pipe 23, said inlet pipe being provided preferably with spraying means 24 for causing the weak acid to flow into the concentrating chamber in the form of a spray, the weak acid being preheated by the countercurrent gases flowing up through the chamber and by the heated packing 19, the more volatile hydrocarbons and the $SO_2$ contained in the acid being here driven off. The preheated separated sludge acid, after moving down the tower, collects in the flue-like trough of the chamber, and is therein subjected to the first heating and concentrating treatment. Heated air or gases is conducted into the pipe sections 14 and forced through the perforations thereof, the said heated gases agitating and heating the body of acid in the trough, the heated gases effecting concentration of the acid and being effective for oxidizing, breaking up and driving off considerable of the organic impurities in the acid.

Taking Example 1 referred to above, and assuming that it is desired to produce in the chamber A a concentration of $52\frac{1}{2}$ degrees Baumé, and assuming further that the weak feed acid is about 32 degrees Baumé, the following conditions control:

$52\frac{1}{2}$ degrees Baumé, boiling point 320° F.
Temperature of bath, 245° F.
32 degrees Baumé, boiling point 265° F.

Under these conditions in order to preheat the acid sufficiently in the tower, the gases exiting from the bath are so controlled as to have a temperature of about 300 degrees with the gases exiting from the tower at about 160 to 170 degrees. As heretofore pointed out, the gases moving through the towers should, generically speaking, be below the boiling point of the incoming weak feed acid; but it has been found that the temperature of the gases exiting from the bath may be somewhat above the concentration point of the incoming weak feed acid, a moderate excess of temperature being here permissible. The temperatures, however, are so controlled that the heat exchange in the tower 18 is such as to preheat the acid sufficiently to drive off the volatile impurities, the temperatures being further controlled to prevent the deposition of carbon and sulphates in the tower, the temperatures given above being utilizable with a concentration of acid at $52\frac{1}{2}$ degrees Baumé. Generally speaking, the heat exchange in the tower should be insufficient to effect concentration of the weak feed acid in the tower, and should be sufficient to volatilize the impurities to advance the foaming point of the acid in the concentrating chamber A.

The temperatures in the tower may be regulated, as heretofore pointed out, by regulating the temperature of the incoming gases in the conduit 15, or by changing the elevation of the pipes 14 submerged in the bath, or by changing the level of the acid in the concentrating chamber A, or by predetermining the size of the tower 18 and the closeness of the packing 19. If it is found, for example, that not enough volatilization of impurities takes place in the tower, and if it is desired to advance the foaming point to say 60 degrees Baumé, the incoming gases may be increased in temperature, or the level of the acid in the concentrating chamber A may be lowered to permit the exiting of higher temperature gases from the bath, or the height of the tower and the closeness of the packing may be increased to effect a greater heat exchange in the tower. If on the other hand it is found that deposition of carbons and sulphates takes place in the tower with the clogging of the same, the heat exchange in the tower is decreased, as by decreasing the temperature of the incoming gases in the conduit 15 or by raising the level of the acid in the bath or by increasing the submergence of the pipes 14 or by decreasing the denseness of the packing in the tower. These factors may each be controlled to obtain the desired results.

In the event of change of any of the above mentioned factors, the concentration or the temperature of the bath may be maintained as desired, this being also or further controlled by regulating the entry of the weak feed acid through the inlet pipe 23. The temperature is noted by means of thermometers immersed in the acid bath in chamber A, and the temperature is regulated by controlling the inflow of the weak acid. Thus if the temperature of the bath rises above the desired point for any particular acid, the flow of weak acid through the inlet is increased, with the result that the concentration of the bath is decreased, the decrease in the temperature following therefrom. If the temperature of the bath falls below the desired point, the reverse procedure is followed.

The second heating and concentrating chamber B is also preferably formed with a trough-like flue having a bottom 25 and an arched roof 26 formed of acid-resisting material, the said flue communicating with the packed absorption tower 27, which may be also provided with a checker brick work 28 suitably supported by bridge 29 and spaced arches 30, the said absorption tower being also provided with a pipe section 31 for conducting the spent gases from the tower 27.

After partially concentrating and purifying the acid in chamber A, the treated acid is conducted to and introduced into chamber B, the egg C having its inlet 32 communicating with and opening into the concentrating chamber A and having its outlet pipe 33 leading to and connecting with the inlet spray 34 of the tower 27. The now partially concentrated acid is thus admitted into the concentrating chamber B in the form of a spray, the acid being further preheated by passing countercurrent to the spent gases moving up the tower 27, the now partially concentrated acid collecting in the concentrating chamber B to undergo further treatment.

The flow of the acid from the chamber A to the egg C, and the flow of the acid from the egg C to the second tower 27 is an uninterrupted flow, the process being a continuous process. The temperature in chamber B is maintained from about 400 degrees F. to 430 degrees F. when making 66 degrees Baumé acid, the temperature in the said chamber B being regulated by controlling the flow of the acid at the inlet 34, in a manner similar to the control of the acid into the chamber A.

The acid in chamber B may be heated in any desired manner, it being preferred however to internally heat the body of the acid in the said chamber. This acid is preferably heated in an agitated condition as by means of heated gases forced under pressure through the body of the acid and bubbling through such acid. For this purpose we also provide in the chamber B a pipe section 35 made of acid-resisting material, the pipe section 35 being provided with a plurality of perforations 36 spaced longitudinally of the pipe, the said conducting pipe section 35 being suitably connected to the source of heated gas supply in a manner similar to the connection of pipe 14 in chamber A. The acid in the concentrating chamber B is heated by this means to effect further concentration of the acid, completion of purification of the same being effected during this heat treatment. The spent gases move up through the tower 27 and they exit through the outlet 31, these spent gases being passed through scrubbing towers or precipitators, not shown, which are suitably connected to the pipe section 31 for the purpose of washing the gases and freeing the same from the obnoxious acid fumes, and for the further purpose of reclaiming the acid fumes for further use.

After effecting the desired concentration of the acid which may be about 66 degrees Baumé, the acid is drawn from the concentrating chamber B, a suitable discharge pipe 37 being provided for this purpose.

The tower 27, contradistinguished from the tower 18, is a concentrating tower, it having been found impossible to prevent concentration in the tower 27 and consequent deposition of carbons and sulphates in such tower when making 66° Baumé acid or stronger. Although considerable of the impurities are removed in the first concentrating treatment, some carbon remains to be treated in the second treatment; and when the acid drawn from the egg C is admitted into the tower 27, this acid is preheated by the spent gases moving up through the tower 27 and the temperature conditions are such as to effect some concentration of the acid in such tower 27. Although there is little carbon remaining in the acid, it has been found that deposition of impurities takes place in this concentrating tower 27, requiring the cleaning thereof every few months. This deposition of impurities in the tower 27 is caused by concentration taking place in the tower resulting from the following example of operating conditions as regards temperatures:

Weak feed acid at $52\frac{1}{2}$ degrees Baumé.

$52\frac{1}{2}$ degrees Baumé acid, boiling point 320 degrees F.

66 degrees Baumé acid in the bath, boiling point 538 degrees F.

Temperature of bath in chamber B, 425 degrees F. With these conditions the gases exiting from the bath will have a temperature above 425 degrees F. and probably about 450 degrees F., which will cause concentration to take place in the tower, as this is a margin of 130 degrees F. above the boiling point of the downcoming weak acid at $52\frac{1}{2}$ degrees Baumé. Although deposition of carbon and sulphates takes place in this second tower 27, with the practice of our method this deposition may be minimized and thus necessitate cleaning of the tower at less frequent intervals, this end being obtained by reason of the fact that when the foaming point in the first stage is advanced to a higher concentration or strength of the acid, a given acid in the first stage may be concentrated up to say 57 degrees Baumé instead of 52½ degrees Baumé. By doing this the weak feed acid in the tower 27 is 57 degrees Baumé and the concentration temperature thereof, instead of being 320 degrees F., is 360 degrees F., thus decreasing the margin to 90 degrees, less concentration and less deposition of carbons and sulphates being thereby effected.

The use of our apparatus and the practice of our method will in the main be apparent from the above detailed description thereof. The weak acid is introduced into the chamber 18 and there preheated to effect volatilization of the more volatile hydrocarbons and the $SO_2$ content, the preheating being controlled to volatilize such impurities to such a degree as to advance the ultimate foaming point of the acid when being treated in the concentrating chamber A, the temperatures being so controlled as to prevent concentration in the tower 18 and consequent deposition of impurities therein. The acid collecting in the concentrating chamber A is heated by the bubbling of hot gases therethrough, concentration in this chamber being effected to an intermediate strength, such as for example 52 or 57 degrees Baumé. The acid after this first heat treatment is then conducted to and passed through the tower 27 and there preheated, the acid then collecting in the concentrating chamber B and there concentrated to a strength of say 66 degrees Baumé.

While we have shown our device and described our method in the preferred form and manner, it will be obvious that many changes and modifications may be made without departing from the spirit of the invention defined in the following claims.

We claim:

1. The method of treating sludge acids or separated sludge acids which consists in first preheating the sludge acid without concentrating the same to drive off the more volatile impurities, and in then subjecting a body of the preheated weak acid to heat treatment to concentrate the same.

2. The method of treating sludge acids or separated sludge acids which consists in first preheating the sludge acid without concentrating the same to drive off the more volatile impurities, and in then bubbling heated air or gas through a body of the preheated weak acid to concentrate the same.

3. The method of treating sludge acids or separated sludge acids which consists in preheating the sludge acid above a predetermined minimum to drive off the more volative impurities and below a predetermined maximum to prevent concentration of the same, in collecting the preheated weak acid in a body, and in then subjecting the said body to heat treatment to concentrate the same.

4. The method of sluge acids or separated sludge acids which consists in preheating the sludge acid above a predetermined minimum to drive off the more volatile impurities and below a predetermined maximum to prevent concentration of the same, in collecting the preheated weak acid in a body, and in then passing heated air or gas through the said body of acid to concentrate the same.

5. The method of treating sludge acids or separated sludge acids which consists in feeding a weak sludge acid into a body of sludge acid, in subjecting the body of acid to heat treatment to concentrate the same, and in preheating the weak feed acid below the concentration point thereof.

6. The method of treating sludge acids or separated sludge acids which consists in feeding a weak sludge acid into a body of sludge acid, in bubbling hot air or gases through the body of acid to concentrate the same, and in preheating the weak feed acid below the concentration point thereof.

7. The method of treating sludge acids or separated sludge acids which consists in feeding a weak sludge acid through a packed tower and into a concentrating chamber, the weak feed acid collecting in a body in the said chamber, in bubbling hot air or gases through the said body of acid to concentrate the same, and in preheating the weak feed acid in the said tower by means of the spent gases exiting from the body of acid, and in regulating the preheating to prevent concentration in the tower.

8. The two stage method of treating sludge acids or separated sludge acids which consists in first preheating the sludge acid above a predetermined point by subjecting the same to the action of heated gases to drive off the more volatile impurities therein to prevent subsequent foaming at low concentration, in then subjecting a body of the preheated acid to a first stage heat treatment to partially concentrate the same to an intermediate strength, and in thereafter subjecting the partially concentrated acid to a second stage heat treatment to complete the concentration thereof.

9. The method of treating sludge acids or separated sludge acids which consists in first preheating the sludge acid above a predetermined point to drive off the more volatile impurities therein to prevent subsequent foaming at low concentration, in then bubbling hot air or hot gases through a body of the preheated acid to partially concentrate the same to an intermediate strength and in thereafter subjecting the partially concentrated acid to further heat treatment to complete the concentration thereof.

10. The method of treating sludge acids or separated sludge acids which consists in first preheating sludge acid without concentration thereof, the preheating being sufficient to drive off the more volatile impurities therein, in then subjecting a body of the preheated acid to heat treatment to partially concentrate the same to an intermediate strength, and in thereafter subjecting the partially concentrated acid to further heat treatment to complete the concentration thereof.

11. The method of treating sludge acids or separated sludge acids which consists in first preheating the sludge acid without concentrating the same and to drive off the more volatile impurities therein, in then bubbling hot air or gases through a body of the preheated acid to partially concentrate the same to an intermediate strength, and in thereafter subjecting the partially concentrated acid to further heat treatment to complete the concentration thereof.

12. The method of treating sludge acids or separated sludge acids which consists in first preheating the sludge acid without concentrating the same and to drive off the more volatile impurities therein, in then bubbling hot air or gases through a body of the preheated acid to partially concentrate the same to an intermediate strength, and in thereafter bubbling hot air or hot gases through the partially concentrated acid to complete the concentration thereof.

13. The method of treating sludge acids or separated sludge acids which consists in bubbling hot air or hot gases through a body of the acid to concentrate the same to an intermediate strength, in feeding a weak acid countercurrent to the spent gases issuing from the body of acid, the spent gases preheating the weak feed acid, in controlling the preheating to prevent concentration during the preheating step, and in thereafter bubbling hot air or hot gases through the partially concentrated acid to effect further concentration of the same.

14. The method of treating sludge acids or separated sludge acids which consists in bubbling hot air or hot gases through a body of the acid to concentrate the same to an intermediate strength, in feeding a weak acid countercurrent to the spent gases issuing from the body of acid, the spent gases preheating the weak feed acid, in controlling the preheating effected by the spent gases to prevent foaming at low concentration in the said body of the acid and in thereafter bubbling hot air or hot gases through the partially concentrated acid to effect further concentration of the same.

15. In a two stage sludge acid concentration process, the steps of heating a body of the sludge acid in the first stage to effect concentration thereof to an intermediate strength, in preheating the sludge acid prior to such heating and in regulating the said preheating to drive off the more volatile impurities in the acid whereby foaming at low concentrations in the said heating stage is prevented.

16. In a two stage sludge acid concentration process, the steps of bubbling hot air or hot gases through a body of the sludge acid in the first stage to effect concentration thereof to an intermediate strength, in preheating the sludge acid prior to such heating and in regulating the said preheating to drive off the more volatile impurities whereby foaming at low concentrations in the said heating stage is prevented.

17. In a two stage sludge acid concentration process, the steps of bubbling hot air or hot gases through a body of the acid in the first stage to effect concentration thereof to an intermediate strength, in feeding a weak sludge acid into the said body countercurrent to the spent gases exiting from the body of acid, the spent gases preheating the weak feed acid and in regulating the said preheating to effect the driving off of the more volatile impurities whereby foaming at low concentrations in the said heating stage is prevented.

18. In a two stage sludge acid concentration process, the steps of feeding a weak sludge acid through a packed tower and into a concentrating chamber, the weak feed acid collecting in a body in the said chamber, in bubbling hot air or gases through the said body of acid to concentrate the same to an intermediate strength, this step comprising the first stage treatment and in preheating the weak feed acid in the said tower by means of the spent gases exiting from the body of acid sufficiently to drive off the more volatile impurities in the acid whereby foaming at low concentrations in the said first heating stage is prevented.

Signed at Charlotte, in the county of Mecklenburg and State of North Carolina, this 19th day of December, A. D., 1921.

INGENUIN HECHENBLEIKNER.
THOMAS C. OLIVER.